United States Patent [19]
Archer

[11] Patent Number: 4,774,649
[45] Date of Patent: Sep. 27, 1988

[54] INTEGRATED MAGNETIC RESONANT POWER CONVERTER

[75] Inventor: Michael P. Archer, Westlake Village, Calif.

[73] Assignee: Power-One, Inc., Camarillo, Calif.

[21] Appl. No.: 69,426

[22] Filed: Jul. 1, 1987

[51] Int. Cl.[4] .......................................... H02M 3/335
[52] U.S. Cl. ........................................ 363/20; 363/97; 363/131; 323/247; 323/248; 323/250
[58] Field of Search ...................... 363/20–26, 363/95, 97, 131; 323/247, 248, 250, 306, 308, 309, 331, 362

[56] References Cited

U.S. PATENT DOCUMENTS

| | | | |
|---|---|---|---|
| 3,316,445 | 4/1967 | Ahrons . | |
| 3,628,047 | 12/1971 | Cronin . | |
| 3,753,076 | 8/1983 | Zelina | 363/20 X |
| 4,027,200 | 5/1977 | Sahara et al. | 363/20 X |
| 4,224,659 | 9/1980 | Iguchi | 363/20 |
| 4,268,898 | 5/1981 | Brown | 363/20 |
| 4,277,824 | 7/1981 | Alberkrack | 363/49 |
| 4,283,759 | 8/1981 | Koiki | 363/19 |
| 4,387,418 | 6/1983 | Koiki | 363/19 |
| 4,415,959 | 11/1983 | Vinciarelli | 363/21 |
| 4,443,839 | 4/1984 | Onodera et al. | 363/20 |
| 4,605,999 | 8/1986 | Bowman et al. | 363/19 |
| 4,675,796 | 6/1987 | Gautherin et al. | 363/20 |

OTHER PUBLICATIONS

"Core Selection for & Design Aspects of an Integrated-Magnetic Forward Converter", E. Bloom, Apr. 1986, pp. 1–10.

"High-Power Ferroresonant Voltage Regulating Transformers", Wroblewski et al., IEEE International Telecommunications Energy Conference, Nov. 1979.

*Primary Examiner*—Patrick R. Salce
*Assistant Examiner*—Emanuel Todd Voeltz
*Attorney, Agent, or Firm*—Koppel & Jacobs

[57] ABSTRACT

A resonant power converter is disclosed which is constructed on an integrated magnetic core, with primary, secondary and tertiary windings occupying separate legs of the core. The tertiary winding is connected in a resonant circuit and induces a flux in the primary leg that causes the primary winding current to assume the shape of a series of generally sinusoidal pulses. Primary winding switching can thus occur at zero primary current between pulses, thereby eliminating prior interference problems. Furthermore, the converter can be operated in a pulse width modulated mode to accommodate for varying output load levels without the problems of low frequency operation encountered by prior frequency modulated resonant converters.

24 Claims, 7 Drawing Sheets 4,774,649

INTEGRATED MAGNETIC RESONANT POWER CONVERTER

BACKGROUND OF THE INVENTION

1. Field of the Invention

This invention relates to DC-to-DC power converters, and more particularly to resonant power converters.

2. Description of the Prior Art

Various DC-to-DC power converters are available for transforming an input DC voltage of one magnitude to an output DC voltage with a different magnitude. Two conventional converter topologies are referred to as the flyback and the forward converters. They are discussed, for example, in a text by George Chryssis, "High-Frequency Switching Power Supplies: Theory and Design", McGraw-Hill Book Co., 1984, pages 11–13.

With a flyback converter, a switch is connected in series with the input winding of a transformer. The switch is alternately turned on and off, producing a pulsing in the secondary winding which is fed through a diode to charge an output capacitor. When the primary current is switched off, the current in the secondary tends to surge. The rate of change of both the primary and secondary currents are very high, leading to electromagnetic interference and radio frequency interference. Complex filters are required to suppress the interference, thereby increasing the complexity and cost of the system and reducing its efficiency.

In the forward converter design an inductor is added to the secondary circuit to reduce the absolute current magnitude in the secondary, while a second diode in the secondary circuit closes a circuit between the output capacitor and inductor when the input switch is off. This design uses a high input current, which is stressful for the switching transistor in the primary circuit. The output diode is stressed by large voltage and current swings, requiring a snubber circuit which adds to the cost and complexity of the system and is an interference source. The large rates of current change in the transformer windings and in the inductor produce electromagnetic and radio frequency interference, which again require complex filters to remove.

Many of the problems associated with flyback and forward converter designs are resolved by the more recent "resonant" converter, which is exemplified in U.S. Pat. No. 4,415,959 to Vinciarelli. In this type of device, the most relevant embodiment of which is shown in FIG. 4 of the patent, a relatively large inductor acts as a current sink in the secondary circuit. A capacitor in the secondary circuit cooperates with the leakage inductance of the transformer to establish an effective LC circuit; this defines a characteristic time scale for the rise and fall of current from the DC voltage source. A switch device in the primary circuit can thus be switched on and off at essentially zero current, thereby overcoming the problems in both the flyback and forward converters associated with switching under high current levels. Following each cycle the energy stored in the capacitor is released by the current sink. After the capacitor has been discharged, the sink current is carried by a diode connected in parallel with the capacitor.

While this type of resonant converter solves the interference problems associated with the flyback and forward converters, it itself has certain limitations. Its output power is modulated by operating the converter over a very wide frequency range, thus forcing the converter to operate at very high frequencies at full power if a wide dynamic range of minimum to maximum output power is required. Attempts to operate the power supply at low frequency for full output power preclude operation at low power levels. Additionally, peak currents in the switching elements increase with increasing input voltage. When the input voltage is at its maximum design rank, peak current stresses on the switching elements become severe. Moreover, the design does not lend itself well to multiple outputs.

SUMMARY OF THE INVENTION

In view of the above problems with the prior art, the object of the present invention is to provide a novel type of voltage converter in which primary side switching takes place at very low or zero currents, thus eliminating the interference problems encountered with the flyback and forward converter designs, and yet operates over a more narrow frequency range under varying power outputs.

Another object of the invention is to provide a novel resonant converter in which the primary current is given a substantially sinusoidal shape through the operation of flux linkages in the transformer despite abrupt on-off switching of the primary circuit, and in which the primary current flow is terminated as a result of the flux linkages rather than the primary switch.

Other objects include decreased cost, increased efficiency and reliability, relative simplicity in design and the capability of multiple outputs.

These and other objects of the invention are realized in a novel resonant power converter construction which employs an integrated magnetic transformer core. The core includes at least three legs which are magnetically coupled with each other. Primary, secondary and tertiary windings are provided on the first, second and third legs of the core, respectively. The primary winding is connected to receive a DC supply voltage, the secondary winding is connected to an output terminal, and the tertiary winding is connected with a capacitor to form a resonant circuit. Current flow through the primary winding is established in a pulsed fashion by means of a switch and associated switch control, and the flux coupling between the windings. The rise and fall of each primary current pulse is gradual rather than abrupt, causing each pulse to assume a generally sinusoidal shape. Each primary current pulse rises initially because of the primary winding's leakage inductance, while the tertiary winding induces a flux in the primary winding which gradually diminishes and eventually terminates the current pulses.

The switch control responds to the output load to control the timing of current initiation through the primary winding at the beginning of each cycle. This permits the power output of the converter to be controlled by means of frequency modulation, phase modulation, or pulse width modulation. The timing of the beginning of each pulse is controlled by the switch in response to the load, while the termination of each pulse is controlled by the resonant winding through a coupling flux in the core. The prior problems of wide frequency range operation are thus completely avoided.

Various embodiments are discussed, including designs in which the tertiary winding and resonant capacitor are connected together either by themselves or with the secondary winding in a resonant circuit, in which the resonant circuit is connected to the primary rather than the secondary side of the converter, and in which dual switches and windings are provided for full-wave rectification. The tertiary winding is preferably connected to an output capacitor out-of-phase with the secondary winding, so as to reduce the peak current applied to the output capacitor to a level below the peak secondary winding current.

These and other features and advantages of the invention will be apparent to those skilled in the art from the following detailed description of preferred embodiments, taken together with the accompanying drawings, in which:

DETAILED DESCRIPTION OF PREFERRED EMBODIMENTS

Figure 1:
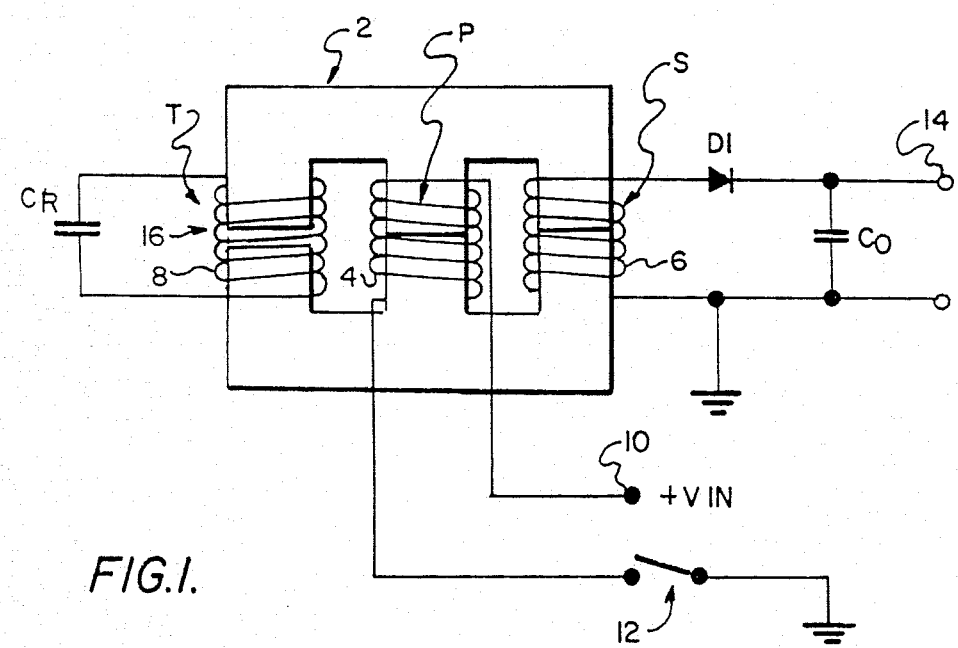
FIG. 1 is a simplified block/schematic diagram illustrating one embodiment of the invention.
Figure 2:
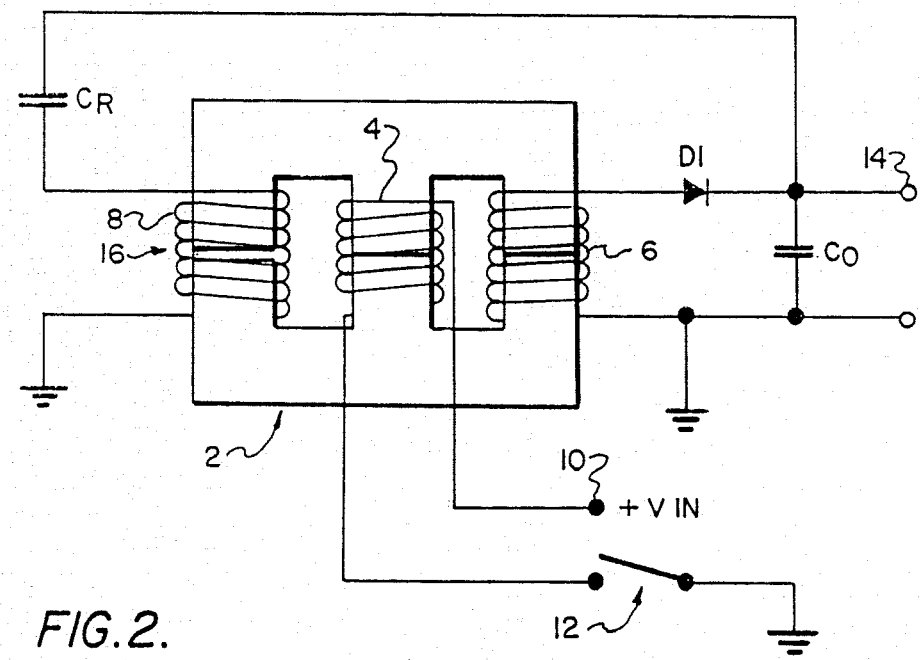
FIG. 2 is a simplified block/schematic diagram illustrating a more preferred embodiment of the invention in which the resonant circuit is coupled with the secondary winding and output terminal.

FIGS. 1 and 2 show two embodiments of DC-to-DC power converters constructed in accordance with the invention, with FIG. 1 representing a basic version and FIG. 2 the more preferred version. In both cases the converter is formed on an integrated magnetic core 2 having at least three legs. Integrated magnetic cores per se are known in other applications, but they have not previously been used in the resonant DC to DC converter field. The novel employment of integrated magnetic cores in this context has been coupled with a new converter design that permits a dramatically different mode of operation with considerably enhanced results.

The integrated magnetic core 2 consists of a magnetic core with at least three different legs which are magnetically coupled with each of the other legs to provide flux paths through each different pair of legs. As shown in the figures, the core consists of three legs labeled P, S and T for primary, secondary and tertiary, respectively. As illustrated, the primary leg is in the middle with the secondary and tertiary legs on the outside, but the positions of the legs are not critical; the primary leg could be located on the outside and either the secondary or tertiary legs in the middle. The integrated magnetic core is preferably formed by joining two "E" cores together, and is designed so that the coupling between each pair of legs is relatively loose. A specific exemplary design is discussed in detail hereinafter.

In both embodiments primary, secondary and tertiary windings 4, 6 and 8 are wound about the corresponding core legs P, S and T, respectively. Primary winding 4 is connected on one side to an input DC voltage supply terminal 10, and on the other side to a switch 12 which completes the circuit when closed. The secondary winding is connected on one side through a diode D1 to an output terminal 14, which provides a regulated DC output. Although illustrated as a diode, D1 could be implemented as any switch having a suitable control to provide rectification. Operation as a multi-quadrant or bi-directional converter is also possible with the addition of suitable additional switching elements, rectifiers, and controls. An output capacitor $C_0$ is connected between the output terminal 14 and the other side of the secondary winding 6, which is also referenced to ground. The output capacitor $C_0$ smooths output pulses received from the secondary winding, as discussed further below, to provide a DC output voltage at terminal 14.

The tertiary winding 8 is connected across a resonant capacitor $C_R$ to form an LC resonant circuit. The tertiary core leg T has an air gap 16 of sufficient size to store enough energy in the resonant circuit to generate an appropriate induced flux in the primary winding 4, as discussed below, without magnetically saturating the core.

The resonant circuit serves two important functions. First, it builds up a flux in the tertiary winding 8 which is reflected back through the integrated magnetic core to the primary winding 4 to terminate primary current pulses in a gradual manner. This permits the primary circuit to be switched at essentially zero current, and thereby avoid the interference problems associated with switching under load. Second, it establishes a substantially constant frequency of operation for the circuit, where the frequency range required for regulation is much less than that required for previous designs, thus avoiding the problems of wide frequency range.

To briefly summarize the operation of the FIG. 1 design, switch 12 is initially switched closed to initiate a cycle. With the integrated magnetic configuration shown, the primary current is initially determined principally by the leakage inductance as referred to the primary winding 4. Since the leakage inductance is through low permeability, high reluctance air, the primary winding current initially increases at a relatively rapid rate. As the cycle proceeds, flux from the resonant circuit is coupled through the integrated magnetic core back to the primary leg P. The coupled flux presents less and less opposition to the flux induced in the primary leg by the primary winding current, and eventually reinforces the latter flux. This causes the primary current to first reduce its rate of increase, then peak, and finally to diminish back to zero in a generally sinusoidal pulse.

The current in secondary winding 6 tracks the primary winding current in the normal transformer fashion, and produces a similarly sinusoidal shaped current pulse which is transmitted through diode D1 and charges the output capacitor $C_0$. After the end of the primary current pulse the switch 12 is opened, and remains open until the beginning of the next cycle, when the operation is repeated. In this manner a series of pulses are applied to the output capacitor $C_0$ to hold it at the desired voltage level for the load at output terminal 14. As described hereinafter, the duration of the pulse is automatically adjusted in response to the load to regulate the energy transfer in a pulse width modulation scheme.

The preferred circuit of FIG. 2 is similar to that of FIG. 1, but in this embodiment the resonant capacitor $C_R$ is connected between tertiary winding 8 and output terminal 14, rather than in a closed resonant circuit solely with tertiary winding 8. In this configuration, as with FIG. 1, the tertiary winding 8 is oriented so that the current is out of phase with the secondary winding 6. In this manner the resonant circuit draws off some of the output current from the secondary winding when that winding is conductive, and delivers a similar amount of current back to the output capacitor $C_0$ when the secondary winding is not conductive; diode D1 prevents the resonant circuit current from flowing to the secondary winding.

The secondary winding when conductive thus contributes current to the resonant circuit, and thereby in effect forms a part of that circuit. The result is to reduce the peak current applied to the output capacitor $C_0$ to a level less than the peak secondary winding current, without diminishing the energy transfer to $C_0$. This helps to avoid stress on $C_0$.

The amount of load current that is allowed to flow in the primary and secondary windings, and hence the power processing capability of the converter, depends upon the amount of steady-state or continuous energy stored in the resonant circuit. The greater the steady-state energy stored in the resonant circuit, the more current will flow during each switch cycle, and the more energy will be processed by the converter.

It is not critical to the invention which winding is on which leg of the transformer core. The invention will function as intended with any winding on any of the legs, so long as the primary, secondary and tertiary windings are on separate legs. The integrated magnetic core must have a minimum of three legs, but may theoretically have any number more than three. Multiple secondary windings may be wound on the secondary leg to provide multiple outputs.

Figure 3:
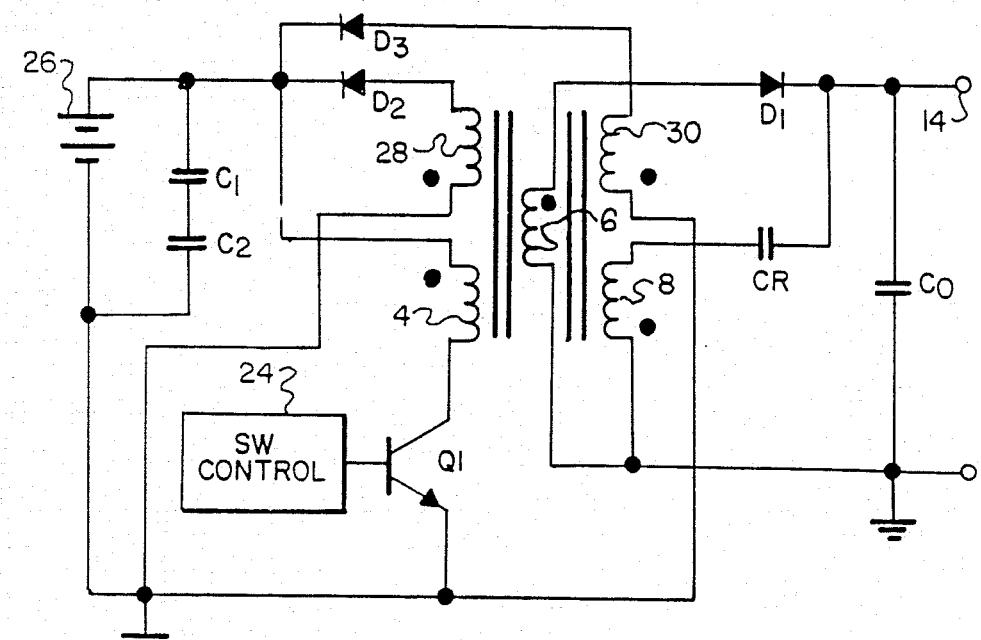
FIG. 3 is a more detailed schematic diagram of the embodiment illustrated in FIG. 2.

FIG. 3 provides a more detailed schematic diagram of the preferred embodiment illustrated in FIG. 2. Common elements in the two figures are indicated by the same reference numerals. It can be seen from the dotted winding convention that the primary and secondary windings 4 and 6 are wound with the same polarity, while tertiary winding 8 in the resonant circuit is wound 180° out of phase.

The primary winding switch is implemented as a unidirectional bipolar transistor Q1 with its collector-emitter circuit in series with the primary winding 4. A switch control circuit 24 has a control output connected to the base of Q1 to alternately enable and disable the transistor from conducting primary current.

The input voltage supply is schematically indicated as a battery 26. In actual practice the input DC voltage is typically provided by a full-wave rectifier supplied from the house voltage. Energy storage capacitors C1 and C2 are connected in series across the input voltage supply 26. Two capacitors C1 and C2 would be used only where a standard voltage doubler is present. Otherwise, a single capacitor of any suitable value to smooth transients could be employed. The primary leg includes a reset winding 28 which is connected on one side through a diode D2 to the junction of input supply 26 and primary winding 4, and on its other side to ground. The reset winding is a conventional technique which is useful in resetting the primary leg of the transformer due to any remaining magnetizing flux which is present at the end of each primary conductive cycle.

The tertiary leg includes a resonant circuit clamp winding 30 which is connected on one side through diode D3 to the same common junction as D2 with voltage supply 26 and primary winding 4, and on its other side to ground. The clamp winding allows excess energy in the resonant circuit to be removed, and also allows the establishment of a defined operating point for the resonant circuit. Such a defined operating point simplifies the control requirements when the system is operated closed loop.

In closed loop operation the timing cycle for turning switch transistor Q1 on and off is controlled in accordance with the output load at output terminal 14. The period within each cycle during which the primary winding switch is closed is regulated by the switch control circuit 24. The switch is closed for longer periods of time under heavy output loads, producing a greater primary current flow and energy transfer to the output, and for shorter periods of time during light output loads.

Figure 4:
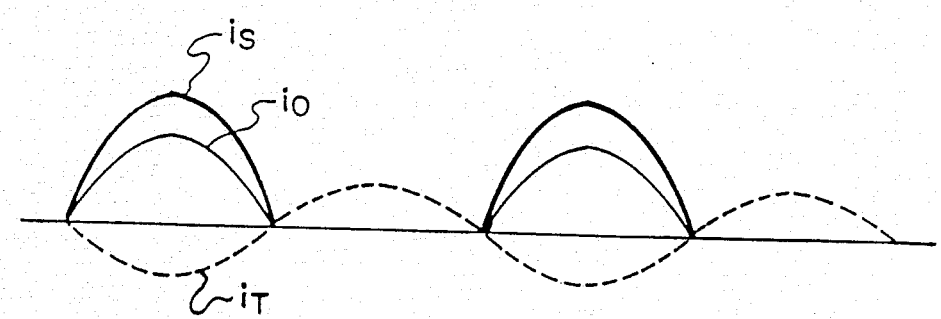
FIG. 4 is an illustrative graph of the output current waveform achieved with the embodiment of FIG. 3.

Since the secondary and tertiary windings 6 and 8 are oriented out of phase, the currents through these windings will likewise be out of phase. This situation is deliberately arranged to reduce the current loading on the output capacitor $C_0$, and yet achieve the same energy transfer. The secondary winding current $I_S$, tertiary winding current $I_T$, and the net current delivered to the output capacitor $I_O$ are illustrated in FIG. 4. During each $I_S$ pulse delivered to the output capacitor, $I_T$ is drawing current away from the capacitor. The result is a smaller net current $I_O$ delivered to the output capacitor. During the next phase of operation $I_S$ is 0 (Q1 is open), while $I_T$ goes positive to deliver current to the output capacitor. During the entire cycle the same energy is thus delivered to $C_0$, but the maximum net current $I_O$ to the capacitor is reduced from the peak value of $I_S$. The peak $I_T$ is preferably about one-third the magnitude of the peak $I_S$.

In one specific implementation of the FIG. 3 arrangement, a 320 volt DC input supply was obtained from a full-wave rectified 115 volt AC line, using a voltage doubler and providing energy storage capacitors C1 and C2 as 470 microfarad, 200 volt electrolytic devices. An EE55 ferrite core was used with its center leg machined down to the same cross-section as the outside legs. Each leg of the core had an effective area of about 1.7 cm$^2$. The primary winding consisted of 120 turns of 19 Ga single strand; its reset winding consisted of 60 turns of 26 Ga single strand wound bifilar with the first 60 turns of the primary winding. Two turns of 14 Ga litz, 2 strand was used for the secondary winding. A 0.3 inch gap was formed in the tertiary leg for the resonant circuit. The tertiary winding consisted of 9 turns of 14 Ga litz, 2 strands; its clamp winding was 50 turns of 24 Ga single strand wound alongside the tertiary winding. The tertiary winding had a measured inductance of 7 microhenries. A 4 microfarad, polypropylene film, low ESR pulse capacitor was used to implement $C_R$. Together with the 7 microhenry tertiary winding, this established a resonant frequency of about 30 KHz. Output capacitor $C_0$ was implemented as four 1,000 microfarad/10 volt rating electrolytic capacitors in series with a 2 microhenry air inductor. The output rectifier D1 was a single Schottky diode rated at 55 amps. A nominal 100 watt, 5 volt, 20 amp output was produced.

Although the input and output sections of the converter of FIG. 3 are illustrated as having a common ground connection, this is not required. The input and output can have separate ground connections to achieve the well-known isolated off-line type of converter. In this case, the tank clamp winding 30 would have sufficient isolation dielectric from the tank winding itself to fulfill the isolation requirements.

Figure 5:
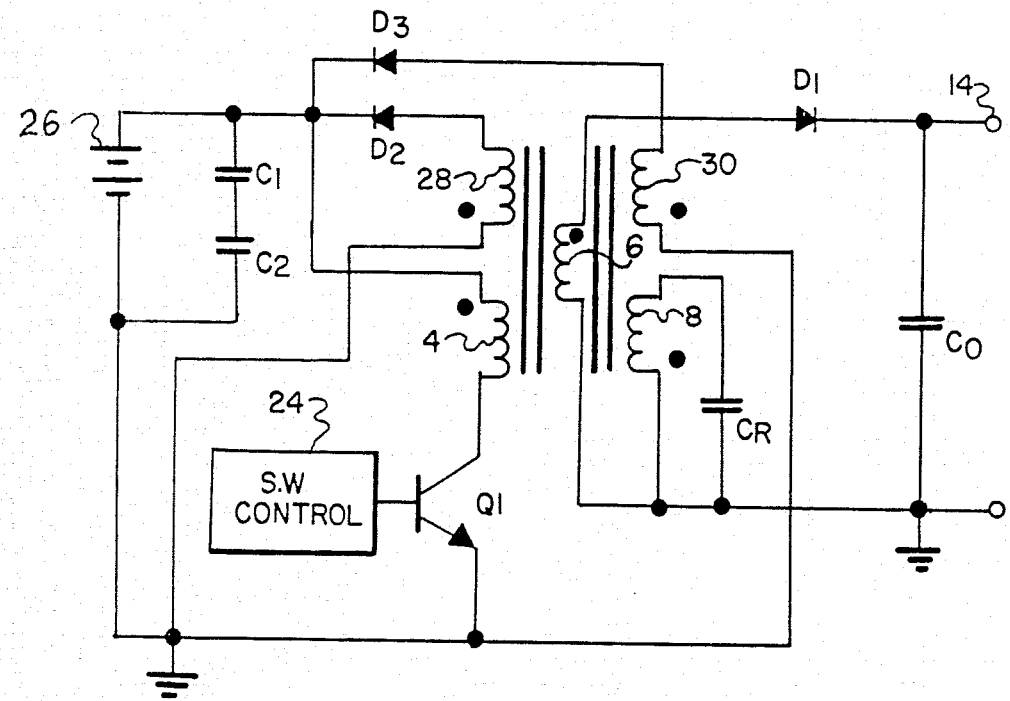
FIG. 5 is a more detailed schematic diagram of the embodiment illustrated in FIG. 1.

A more detailed schematic diagram of the embodiment illustrated in FIG. 1 is provided in FIG. 5. This embodiment is similar to that of FIG. 3, except the resonant circuit is restricted to a closed loop consisting of tertiary winding 8 and capacitor $C_R$.

Figure 6:
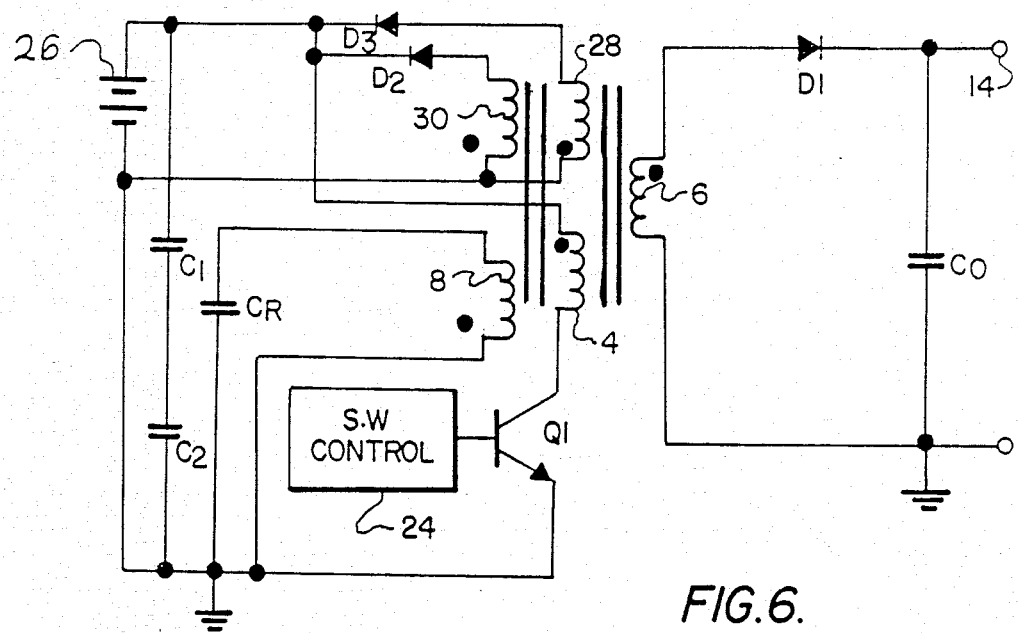
FIG. 6 is a schematic diagram of an embodiment in which the resonant circuit is connected on the primary side.

A different embodiment in which the resonant circuit is tied into the primary side ground is shown in FIG. 6. This approach offers an operation equivalent to that of FIG. 5, in which the resonant circuit is tied into the ground on the secondary side.

Figure 7:
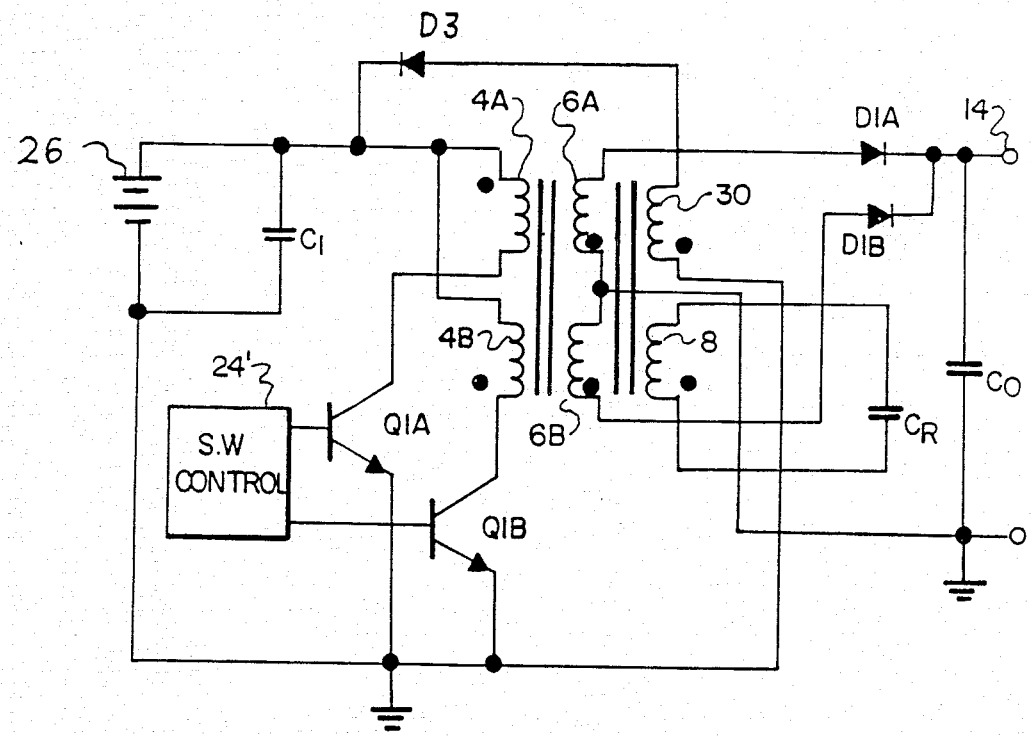
FIG. 7 is a schematic diagram of a double-ended embodiment which produces full-wave rectification.

The various embodiments discussed thus far are single-ended, meaning they produce a single rectified current pulse in the primary and secondary windings for each complete cycle of operation. A circuit which enables double-ended operation equivalent to full-wave rectification, with a pair of primary and secondary current pulses for each cycle, is shown in FIG. 7. Two primary windings 4A and 4B are provided on the primary leg, while two secondary windings 6A and 6B are provided on the secondary leg. The primary windings are connected in series with respective switch transistors Q1A and Q1B. These transistors are controlled in an alternating switching pattern by switch control 24' such that Q1A is off when Q1B is on, and vice versa. A center tap in the secondary winding is grounded, while secondary windings 6A and 6B are connected to the output capacitor $C_0$ through diodes D1A and D1B, respectively. With Q1A gated and Q1B off, current can flow through primary winding 4A to induce a corresponding current pulse in secondary winding 6A which is delivered to the output capacitor $C_0$ through diode D1A. Similarly, when Q1B is gated and Q1A is off, a current pulse flows through primary winding 4B to induce a corresponding current pulse in secondary winding 6B, which is delivered to $C_0$ through diode D1B. In this manner the output capacitor is charged with a pair of pulses during each operating cycle.

The converter can be operated either "closed loop" or "open loop". In open loop operation the period of time that the primary winding switch is on is not phase modulated, but rather is fixed with respect to the resonant circuit phase, typically at the full power position. In this mode of operation the output voltage decreases with increasing load, but the no-load output voltage is always the input voltage multiplied by the turns ratio between the primary and secondary windings. Open loop operation might be desirable in uninterruptible power systems, when stability is not a problem, or when a separate voltage regulator is provided at the output of the converter.

Figure 8:
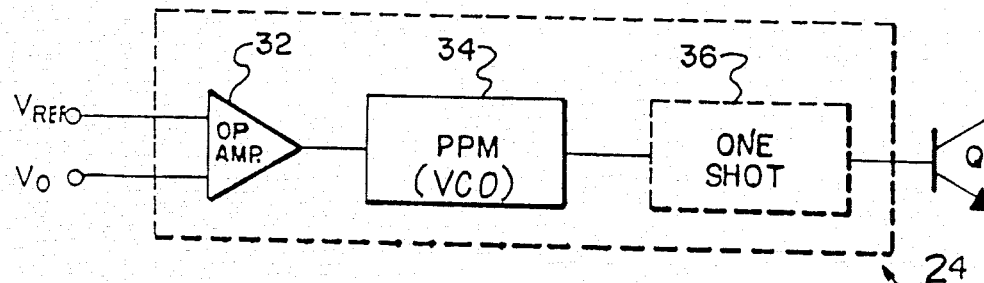
FIG. 8 is a block diagram of the control circuit for the primary winding switch.

In closed loop operation the turn-on time for switch Q1 within each cycle is phase modulated with respect to the resonant circuit. The regulation loop can be closed by comparing the output voltage with a reference voltage, and phase modulating the switch times in response to the difference between the two voltages. A circuit for accomplishing this function is illustrated in FIG. 8. Switch control 24, indicated in a dashed line, includes an operational amplifier 32 having one input connected to the output voltage at output terminal 14, and its other input connected to a voltage reference. The operational amplifier output is connected to a pulse position modulator (VCO) 34, the output of which in turn is connected to a one-shot circuit 36. The op amp 32 produces an output which varies with the difference between its two sensed voltages, while pulse position modulator 34 triggers one-shot 36 at a time corresponding to the level of the op amp output. The pulse position modulator 34 triggers the one-shot earlier in the resonant cycle as the differential between the input voltages to the op amp 32 increases. One-shot 36 establishes an on time for the switching transistor Q1, automatically turning the switch off after a time interval that varies with the voltage differential between the op amp inputs. For steady-state operation, one-shot 36 allows the primary current pulse to fall to 0 under the influence of the resonant circuit before opening Q1.

Figure 10:
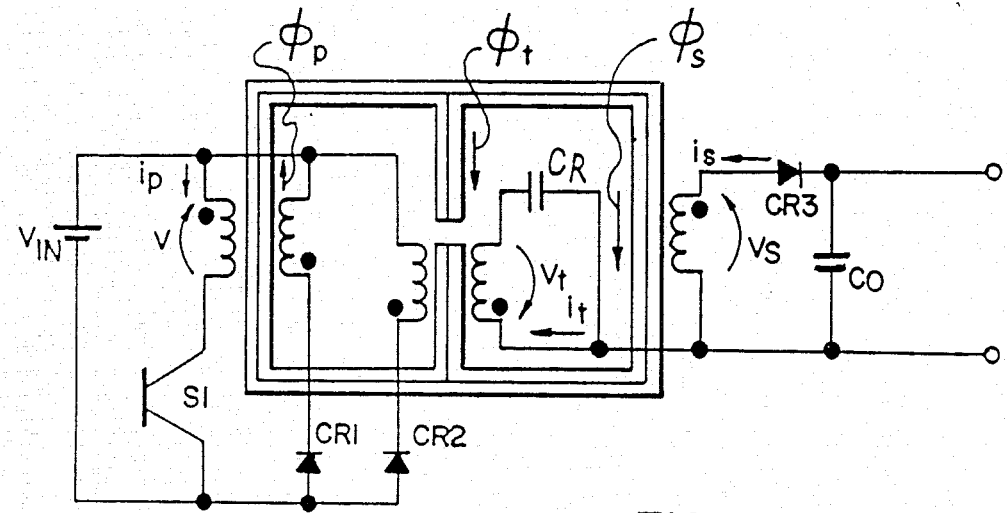
FIG. 10 is a schematic diagram of the embodiment corresponding to FIGS. 9(a)-(e)
Figure 9:
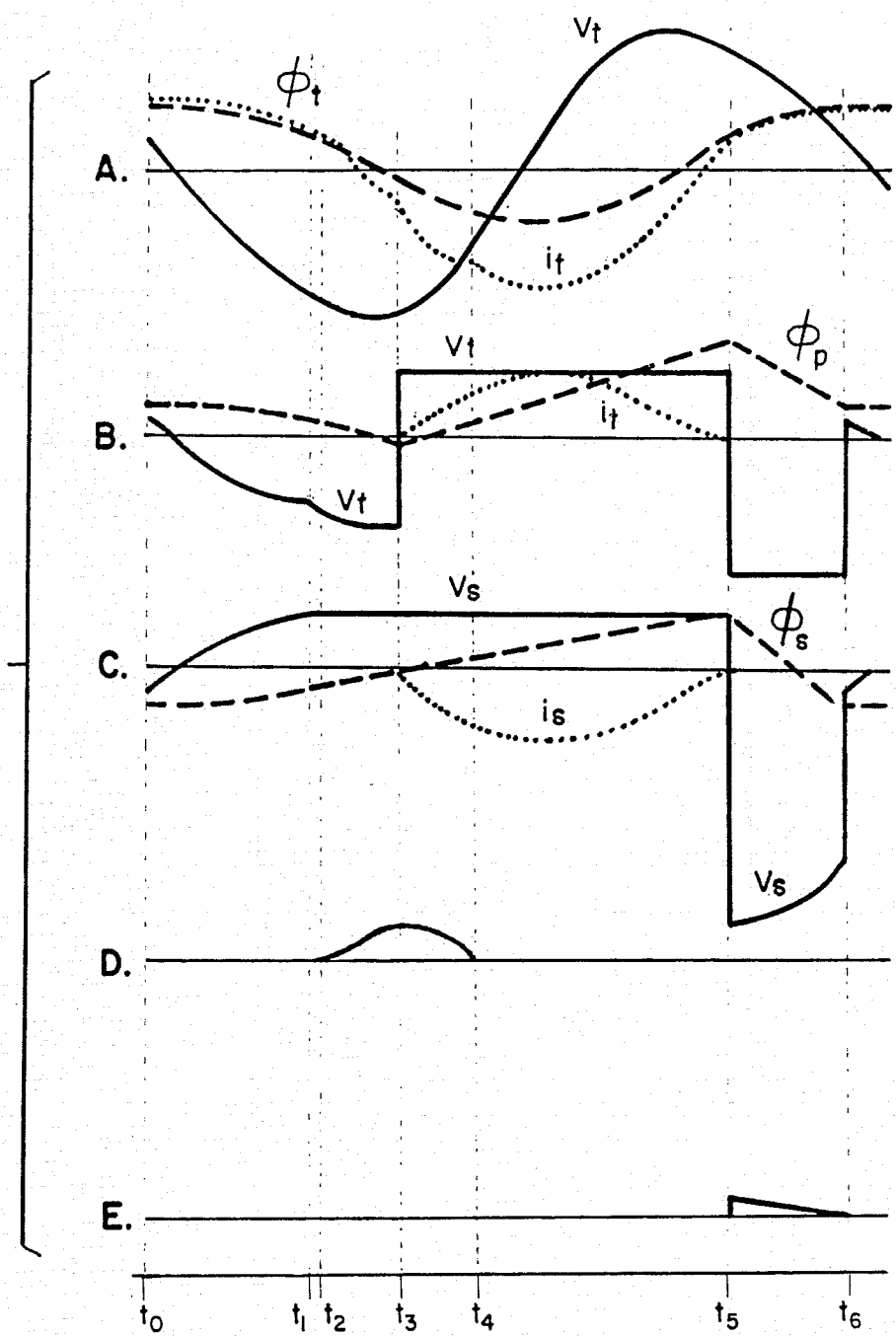
FIGS. 9(a)-(e) are flux, voltage and current traces illustrating the operation of one embodiment of the invention.

The operating principles of the converter will now be explained with respect to the fluxes generated by the windings on the transformer. The flux, voltage, and current conditions are illustrated in FIGS. 9(a), 9(b) and 9(c) for the tank, primary and secondary windings, respectively. FIGS. 9(a)–(c) illustrate these waveforms for one complete conduction cycle of operation at nominal load conditions. FIGS. 9(d) and 9(e) illustrate the current that flows in the tank clamp and primary reset windings, respectively. The converter exemplified for the waveforms of FIGS. 9(a)–(e) and for this explanation is shown in FIG. 10. It has equal numbers of turns for the primary, secondary and tank windings; a primary reset winding with half the number of turns of the primary winding; a tank leg gap with a suitable dimension so that the inductance of the tank winding in cooperation with the capacitance of the resonating capacitor causes the tank to resonate at the desired frequency, and such that a tank flux is generated as shown in FIG. 9(a), and a tank reset winding with half the number of turns of the tank winding. The converter is operating in a steady state condition with a regulated output voltage that is about 10% less than the input voltage. The fluxes of FIGS. 9(a)–(c) are shown on the same vertical flux scale as one another. The currents for FIGS. 9(a)–(c) are shown on the same vertical scale as one another. The voltages for FIGS. 9(a)–(c) are also shown on the same vertical scale as one another. The current of FIG. 9(c) is not shown on the same current scale as the other currents, as it would be too small to illustrate in the figure. FIG. 10 is a semi-schematic illustration of the circuit for the converter configuration pertaining to the description. In FIG. 10 the phase dots are located with respect to the polarities of the fluxes and voltages in FIGS. 9(a)–(c). The fluxes in the figures are the actual fluxes associated with the windings; these differ from the core flux by leakage flux.

The operating principles of the converter will be given with reference to the three major phases of one operating cycle, where a cycle comprises the three successive phases of: (1) ON phase, where the switch in the primary winding is ON and power flows from the primary to the output; (2) DEMAG phase, where the switch is OFF, and the primary leg of the core is being magnetically reset; and (3) OFF phase, before the next ON phase and where only the tank winding is conducting current. It should be understood that for different operating conditions other than the one shown for this detailed description, the fraction of one cycle occupied by each phase changes; for example, at maximum power the OFF phase might be reduced to nearly zero, while the ON phase is much increased. For a better understanding, reference is had to FIGS. 9(a)–(e) and 10 while describing the three operating phases.

In order to describe the operation of the converter with respect to the fluxes, a flux situation is defined where there is a flux balance $\phi_L$ defined as $\phi_L = \phi_P - \phi_S - \phi_T$ where $\phi_P$ is the total winding flux of the primary winding, $\phi_S$ is the total winding flux of the secondary winding, and $\phi_T$ is the total winding flux of the tank winding. $\phi_L$ represents the existence of a leakage flux such that whenever $\phi_L$ is some other value than zero, a leakage flux component exists which must be accounted for by current flow in the primary, secondary and tank windings.

For the OFF phase, shown as $t_0$ to $t_3$ in FIGS. 9(a)–(e), the switch is open and no current is flowing in the primary or secondary windings. The transformer flux is driven by only the tank winding; thus the tank current, all voltages and all fluxes follow the natural sinusoidal oscillation of the tank.

The ON phase is defined as the time during the cycle when the switch is closed, as illustrated in the figures from $t_3$ to $t_5$. Immediately before the switch is closed, $\phi_L = 0$ so there is no current flow in the primary or secondary windings. At a time $t_3$ the switch is closed. At this time one winding on each leg is connected to a voltage source or sink: the primary winding is connected across the input capacitor voltage, the secondary winding is connected across the output capacitor voltage, and the tank winding is connected across the tank capacitor. Now, each winding is imposing its own $d\phi/dt$ (rate of change of flux). Thus, $\phi_L$ becomes a non-zero sinusoidally changing value, in response to which a sinusoidally changing current, starting at zero, begins to flow in the primary, secondary and tank windings. As the ON cycle progresses, the sinusoidal change of the tank flux causes the magnitude of $\phi_L$ to increase sinusoidally to some maximum, and then become progressively and sinusoidally smaller, to the point at $t_5$ where $\phi_L$ once again becomes zero. Primary current now becomes nearly zero (with the exception of a small magnetizing component, which is reset during the DEMAG phase, as described below). Thus there is a sinusoidal current waveform simultaneously flowing in the primary, secondary and tank or inductor windings due to the non-zero sinusoidally changing value of $\phi_L$. The value and rate of change of $\phi_L$ depends on the leakage inductance of the transformer, which can be determined for any transformer, including integrated magnetic transformers, according to well-known principles.

The above-mentioned sinusoidal primary winding current provides input energy for the power conversion process. The secondary winding current provides the output energy from the conversion process.

A sinusoidal current component also flows in the tank winding; this adds some energy to the tank. The amount of energy added to the tank is proportional to the voltage difference between the input voltage and the output voltage. This tank current component causes the slope of the tank voltage to become somewhat steeper than just the natural tank voltage waveform alone, which increases the tank frequency. This can be seen from the tank current and voltage waveforms in FIG. 9(a) for the interval when the switch is closed. Excess tank energy is returned to the input voltage source through the tank clamp diode $CR_2$, as shown by the current waveform in FIG. 9(d), from $t_2$ to $t_4$.

The load current flowing in the secondary is essentially the same as the current in the primary winding, the only difference being that a small additional current is flowing in the primary to account for the magnetizing flux associated with the primary and secondary. As mentioned above, this secondary current flow is the output power of the converter.

It should be understood that for primary to secondary turns ratios of other than one-to-one, the secondary current would be proportioned to the primary current by the turns ratio, according to conventional transformer theory. If multiple output windings were wound on the secondary leg of the transformer, the total output ampere-turns flowing in all of the secondaries would be essentially equal to the ampereturns of the primary winding, in accordance with transformer theory.

The DEMAG phase occurs from $t_5$ to $t_6$. At $t_5$, when the load current in the secondary has decreased to zero, the switch is opened. Some magnetizing flux is present in the core when the switch opens; this flux causes a reset current to flow in the reset winding as illustrated in FIG. 9(e), from $t_5$ to $t_6$. This current returns magnetizing energy to the input voltage source. At $t_6$ DEMAG is completed, the reset diode current has decreased to zero, and the cycle of operation begins over again with the OFF phase, as illustrated beginning with $t_0$.

It should be noted from observing FIG. 9(c) that from $t_1$ to $t_3$ there is a voltage on the secondary winding induced by the tank flux, and that this voltage may cause the output diode to become forward biased some time before the switch is closed for the ON cycle. As soon as this tank-induced voltage component causes the output diode to become forward biased, the secondary leg behaves as if a voltage source is connected across the secondary winding, so the remainder of the tank flux is carried in the primary leg. Even so, only a small amount of current flow is generated in the secondary winding.

Figure 11:
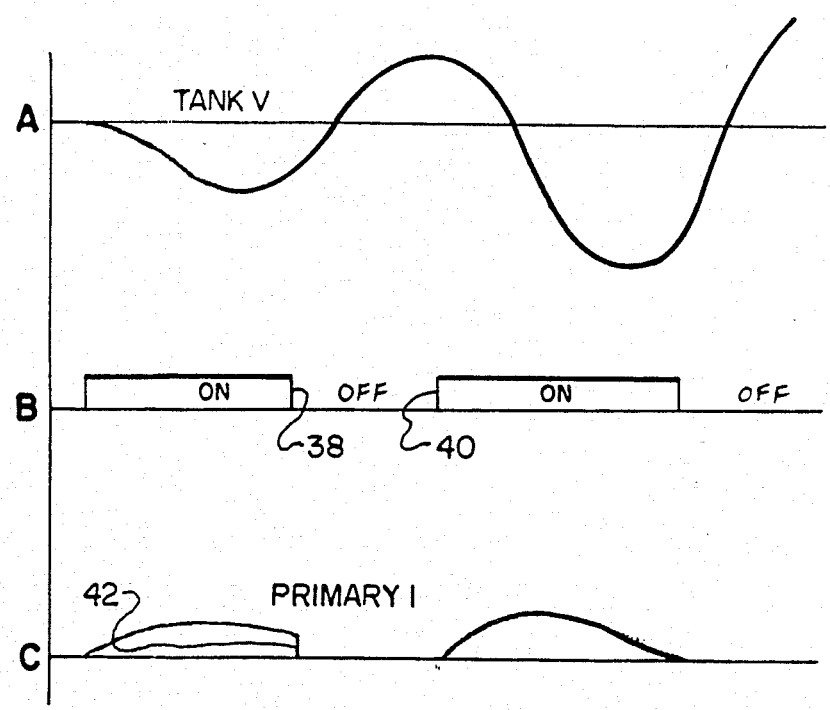
FIGS. 11-14 are graphs illustrating the voltages and current at various locations in the converter under startup, light load, medium load and heavy load conditions, respectively.

The operation of the preferred embodiment of FIG. 3 during startup, light load, medium load and heavy load conditions is illustrated in FIGS. 11, 12, 13 and 14, respectively. FIG. 11 illustrates waveforms when the power supply is first starting. Line A illustrates the tank voltage, which is initially at zero. Line B is timing of the switch, where the full input voltage is applied to the primary when the switch is ON, and zero volts applied when the switch is OFF. When the switch is initially closed, primary winding current begins to flow (line C). This primary winding current will reach a positive peak and then begin to diminish generally sinusoidally. Ideally, the primary winding current will have diminished to 0 by the time the switch is turned off. However, during the initial cycle the tertiary winding flux will typically not build up sufficiently to reduce the primary current all the way to zero by the time the switch turns off. Accordingly, during the initial cycle of operation the primary winding current will typically be abruptly shut off by the switch opening, as indicated at 42. Thereafter the tertiary winding voltage will have built up sufficiently to reduce the primary current to zero by the time the switch opens. This switching at essentially zero current avoids prior problems with interference.

Figure 12:
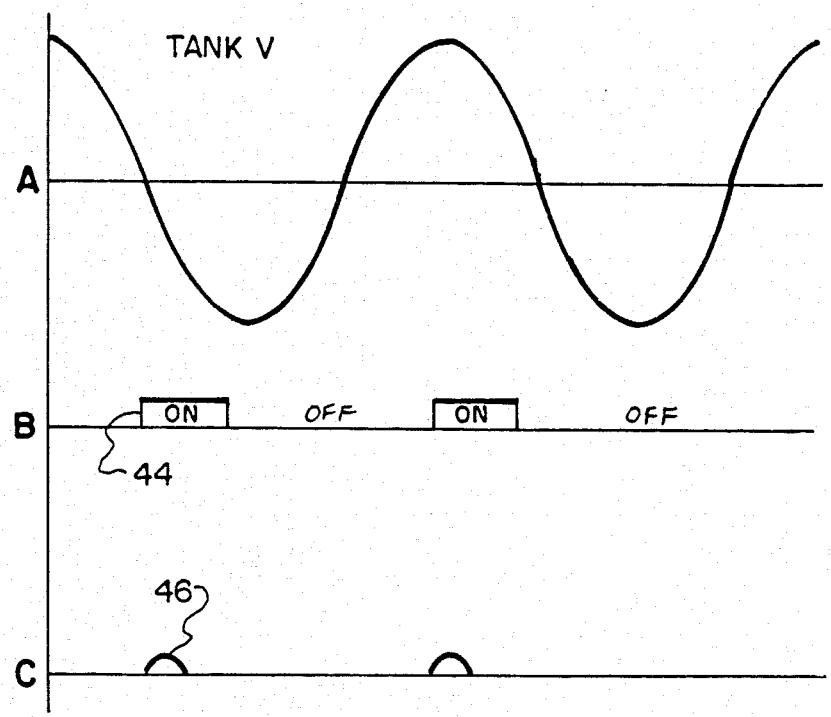

The situation under a light load is illustrated in FIG. 12. The switch control circuit senses the light load, and accordingly sets the switch to turn on relatively late in the cycle at 44, after the tertiary voltage has entered its negative phase. Since the tertiary flux resists the buildup of primary current from the start of the cycle, that current will terminate after only a short pulse 46.

Figure 13:
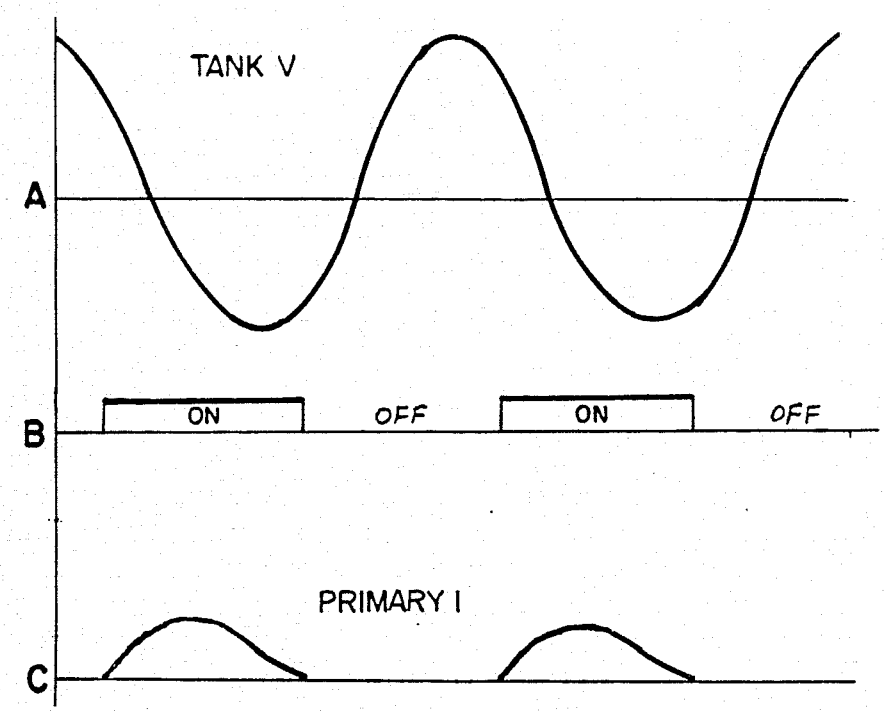
Figure 14:
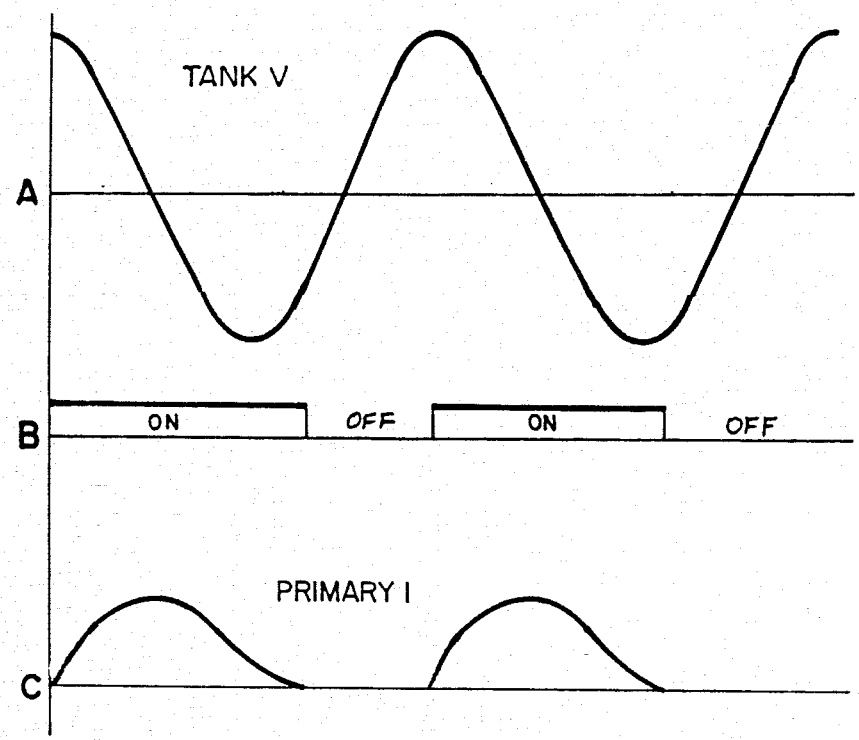

For medium loads, illustrated in FIG. 13, the switch control turns on earlier in the cycle, while the tertiary voltage is still positive, and does not turn off again until later in the cycle than with light loads. More time is therefore required to terminate the primary current. For heavy loads, illustrated in FIG. 14, the switch is turned on even earlier during each cycle. Although the switch is illustrated as being turned on in coincidence with the positive tertiary voltage peak, it could be turned on even slightly before this time. This results in a large primary current pulse to charge the output capacitor. It will be noted that the current pulses are generally sinusoidal but not perfect sine waveforms in shape, the latter half of each pulse being slightly concave in this case.

The converter thus employs a type of pulse width modulation that is achieved by frequency or phase modulation over a relatively narrow frequency range to adjust to different load levels. This is a considerable improvement over prior frequency modulated designs, since it eliminates the problems previously encountered with very wide frequency range required for regulation. The desirability of pulse width modulation is discussed, for example, in a text by Abraham I. Pressman, "Switching and Linear Power Supply, Power Converter Design," Hayden Book Company, 1977, pages 5-8 and 12-13.

Various embodiments of a novel integrated magnetic resolnant converter have thus been shown and described. In addition to solving the prior interference and frequency range problems, the converter is relatively low in cost, increases efficiency and reliability, is relatively simple and inexpensive to build, is capable of a theoretically unlimited number of outputs, and exhibits a high power density. As numerous variations and alternate embodiments will occur to those skilled in the art, it is intended that the invention be limited only in terms of the appended claims.

I claim:

1. A resonant power converter for converting an input DC voltage of one magnitude to an output DC voltage of another magnitude over an operating power range, comprising:
   an integrated transformer core having at least first, second and third legs which are magnetically coupled with each other,
   a primary winding on the first leg connected for receiving an input DC supply voltage,
   a switch connected to alternately enable and disable the flow of current through the primary winding,
   a switch control connected to operate the switch in a rectifying cycle,
   a secondary winding on the second leg,
   an output terminal connected in circuit with the secondary winding,
   a tertiary winding on the third leg, and
   a capacitor connected in circuit with the tertiary winding to form a resonant circuit which is coupled through the core in a common magnetic flux path with the primary winding to format the primary winding current into a series of generally sinusoidal pulses.
   said resonant circuit being configured to remain magnetically unsaturated over said operating power range.

2. The resonant power converter of claim 1, wherein said tertiary winding and capacitor are connected together in a resonant circuit.

3. The resonant power converter of claim 1, wherein said tertiary winding and capacitor are connected together with the secondary winding in a resonant circuit.

4. The resonant power converter of claim 1, said switch control being responsive to an output load at the output terminal to control the timing of the initiation of current flow through the primary winding at the beginning of each cycle.

5. The resonant power converter of claim 4, said resonant circuit being configured to produce a flux through the core that opposes the primary winding current and terminates said current subsequent to its initiation.

6. The resonant power converter of claim 5, said switch enabling only unidirectional current through the primary winding.

7. The resonant power supply of claim 5, said switch control including means for setting the switch to inhibit the flow of primary winding current during each duty cycle no earlier than the termination of primary winding current by said resonant circuit.

8. The resonant power supply of claim 7, said switch control including means for setting the switch to terminate the flow of primary winding current a predetermined period of time after the initiation of said current during at least one startup cycle, even if the primary winding current has not been terminated by said resonant circuit during said cycle.

9. The resonant power converter of claim 5, said resonant circuit being configured to develop a maximum induced voltage across the primary winding which exceeds the supply voltage applied to the primary winding.

10. The resonant power converter of claim 9, said third core leg including an air gap dimensioned to store sufficient energy in said resonant circuit during each half-cycle of operation to generate said induced voltage without magnetically saturating the core.

11. The resonant power converter of 1, further comprising a rectifying means and output capacitor connected in circuit with the secondary winding and the output terminator to produce a smoothed DC signal at the output terminal in response to a pulsed signal on the secondary winding.

12. The resonant power converter of claim 11, wherein said resonant circuit is connected in circuit with said output capacitor, and said secondary and tertiary windings are oriented on the core so that the resonant circuit supplies a current to the output capacitor which is out of phase with the secondary winding current, thereby reducing the peak current applied to the output capacitor to a level below the peak secondary winding current.

13. The resonant power converter of claim 1, further comprising a second primary winding on the first leg connected to receive said input supply voltage, and a second switch connected to alternately enable and disable the flow of current through said second primary winding, said switch control being connected to operate both switches alternately in a full wave rectifying cycle.

14. A resonant power converter for converting an input DC supply voltage of one magnitude to an output DC voltage of another magnitude over an operating power range, comprising:

an integrated transformer core having at least first, second and third magnetically coupled legs, each of said legs forming respective magnetic flux circuits with each of the other legs, a primary winding on the first leg connected to receive an input DC supply voltage, said winding developing a flux which comprises an air leakage flux for the primary winding and a primary core flux in response to current flow through the winding, a switch connected to alternately enable and disable the flow of current though the primary winding, a switch control connected to periodically gate the switch to enable primary winding current flow at a switching rate corresponding to a desired frequency, a secondary winding on the second leg, an output terminal connected in circuit with the secondary winding, a tertiary winding on the third leg, and a capacitor connected in circuit with the tertiary winding to form a resonant circuit therewith having a resonant frequency which establishes said desired frequency, said tertiary winding being oriented on said third leg to return a flux back through the core in a common flux path with the primary winding, said returned flux opposing the primary core flux upon closing of the switch to produce a relatively low net primary winding flux, and thereafter to reverse its opposition to boost the primary core flux, the primary winding current initially rising in response to said relatively low net flux and thereafter terminating in response to said boosted flux, said resonant circuit being configured to store sufficient energy to generate said returned flux without saturating the core.

15. The resonant power converter of claim 14, said third core leg including an air gap dimensioned to store sufficient energy in said resonant circuit to induce a flux in the primary leg that substantially cancels the primary winding core flux upon closing of the switch.

16. The resonant power converter of claim 14, wherein said tertiary winding and capacitor are connected together in a resonant circuit.

17. The resonant power converter of claim 14, wherein said tertiary winding and capacitor are connected together with said secondary winding in a resonant circuit.

18. The resonant power converter of claim 14, said switch control being responsive to an output load at the output terminal to control the timing of the initiation of current flow through the primary winding at the beginning of each cycle of switch operation.

19. The resonant power converter of claim 18, said switch enabling only unidirectional current through the primary winding.

20. The resonant power supply of claim 18, said switch control including means for setting the switch to inhibit the flow of primary winding current, said inhibition commencing during each cycle no earlier than the termination of said current by said resonant circuit.

21. The resonant power converter of claim 20, said resonant circuit storing insufficient energy during a startup cycle to terminate the primary winding current, wherein said switch control including means for setting the switch to terminate the flow of primary winding current a predetermined period of time after the initiation of said current during at least one startup cycle, even if the primary winding current has not been terminated by the resonant circuit during said cycle.

22. The resonant power converter of claim 14, further comprising a rectifying means and output capacitor connected in circuit with the secondary winding and the output terminator to produce a smoothed DC signal at the output terminal in response to a pulsed signal on the secondary winding.

23. The resonant power converter of claim 22, wherein said resonant circuit is connected in circuit with said output capacitor, and said secondary and tertiary windings are oriented on the core so that the resonant circuit supplies a current to the output capacitor which is out of phase with the secondary winding current, thereby reducing the peak current applied to the output capacitor to a level below the peak secondary winding current.

24. The resonant power converter of claim 14, further comprising a second primary winding on the first leg connected to receive said input supply voltage, and a second switch connected to alternately enable and disable the flow of current through said second primary winding, said switch control being connected to operate both switches alternately in a full wave rectifying cycle.

* * * * *